(12) United States Patent
Yamazaki et al.

(10) Patent No.: US 12,005,782 B2
(45) Date of Patent: Jun. 11, 2024

(54) VEHICLE DRIVING DEVICE

(71) Applicant: SUBARU CORPORATION, Tokyo (JP)

(72) Inventors: Yoshinobu Yamazaki, Tokyo (JP); Masami Oguri, Tokyo (JP); Yoshitsugu Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 202 days.

(21) Appl. No.: 17/724,627

(22) Filed: Apr. 20, 2022

(65) Prior Publication Data

US 2022/0348069 A1    Nov. 3, 2022

(30) Foreign Application Priority Data

Apr. 28, 2021  (JP) .................................. 2021-076544

(51) Int. Cl.
*B60K 6/24*         (2007.10)
*B60K 6/26*         (2007.10)
*B60K 6/365*        (2007.10)
*B60K 6/38*         (2007.10)
(Continued)

(52) U.S. Cl.
CPC ................ *B60K 6/365* (2013.01); *B60K 6/24* (2013.01); *B60K 6/26* (2013.01); *B60K 6/38* (2013.01); *B60K 6/40* (2013.01); *B60K 6/445* (2013.01)

(58) Field of Classification Search
CPC . B60K 6/365; B60K 6/24; B60K 6/26; B60K 6/38; B60K 6/40; B60K 6/445
See application file for complete search history.

(56) References Cited

U.S. PATENT DOCUMENTS 5,856,709 A    1/1999  Ibaraki et al.
8,992,362 B2 *  3/2015  Ziemer ................... B60K 6/48
                                              475/5

(Continued)

FOREIGN PATENT DOCUMENTS

JP        9-193676 A      7/1997
WO    2013/132639 A1    9/2013

*Primary Examiner* — John D Walters
(74) *Attorney, Agent, or Firm* — TROUTMAN PEPPER HAMILTON SANDERS LLP

(57) ABSTRACT

A vehicle driving device mounted on a hybrid vehicle includes an engine coupled to wheels of the vehicle via a power transmission path, a transmission mechanism disposed on the power transmission path, a motor generator, a first power transmission mechanism, and a second power transmission mechanism. The motor generator is disposed on a path coupling the engine and transmission mechanism, the first power transmission mechanism is disposed on a path coupling the engine and motor generator, the second power transmission mechanism is disposed on a path coupling the motor generator and transmission mechanism. These paths are included in the power transmission path. The first power transmission mechanism includes a large-diameter rotator and a small-diameter rotator coupled to the engine and the motor generator respectively. The second power transmission mechanism includes a small-diameter rotator and a large-diameter rotator coupled to the motor generator and the transmission mechanism respectively.

16 Claims, 16 Drawing Sheets

(51) Int. Cl.
*B60K 6/40* (2007.10)
*B60K 6/445* (2007.10)

(56) References Cited

U.S. PATENT DOCUMENTS 9,682,700 B2 * 6/2017 Isomura ............... B60W 10/06
2015/0031503 A1 1/2015 Isomura et al.

* cited by examiner

VEHICLE DRIVING DEVICE

CROSS-REFERENCE TO RELATED APPLICATION

The present application claims priority from Japanese Patent Application No. 2021-076544 filed on Apr. 28, 2021, the entire contents of which are hereby incorporated by reference.

BACKGROUND

The disclosure relates to a vehicle driving device mountable on a hybrid vehicle.

A vehicle driving device that includes an engine and a motor generator as power sources is mounted on a hybrid vehicle (see Japanese Unexamined Patent Application Publication No. H9-193676 and International Publication No. 2013/132639).

SUMMARY

An aspect of the disclosure provides a vehicle driving device to be mounted on a hybrid vehicle. The vehicle driving device includes an engine, a transmission mechanism, a motor generator, a first power transmission mechanism, and a second power transmission mechanism. The engine is to be coupled to wheels of the vehicle via a power transmission path. The transmission mechanism is disposed on the power transmission path. The motor generator is disposed on a path coupling the engine and the transmission mechanism in the power transmission path. The first power transmission mechanism is disposed on a path coupling the engine and the motor generator in the power transmission path. The first power transmission mechanism includes a first large-diameter rotator that is coupled to the engine and a first small-diameter rotator that is coupled to the motor generator. The first large-diameter rotator is larger in diameter than the first small-diameter. The second power transmission mechanism is disposed on a path coupling the motor generator and the transmission mechanism in the power transmission path. The second power transmission mechanism includes a second small-diameter rotator that is coupled to the motor generator and a second large-diameter rotator that is coupled to the transmission mechanism. The second large-diameter rotator is larger in diameter than the second small-diameter rotator.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

To ensure fuel efficiency performance of a hybrid vehicle and enhance power performance of the hybrid vehicle, an increased motor torque is desirable. A typical approach to this end is to increase the size of the motor generator. Such increase in the size of the motor generator may lead to an increase in the cost and weight of the hybrid vehicle. Therefore, it is desirable to enhance the power performance of the hybrid vehicle while suppressing an increase in the size of the motor generator.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
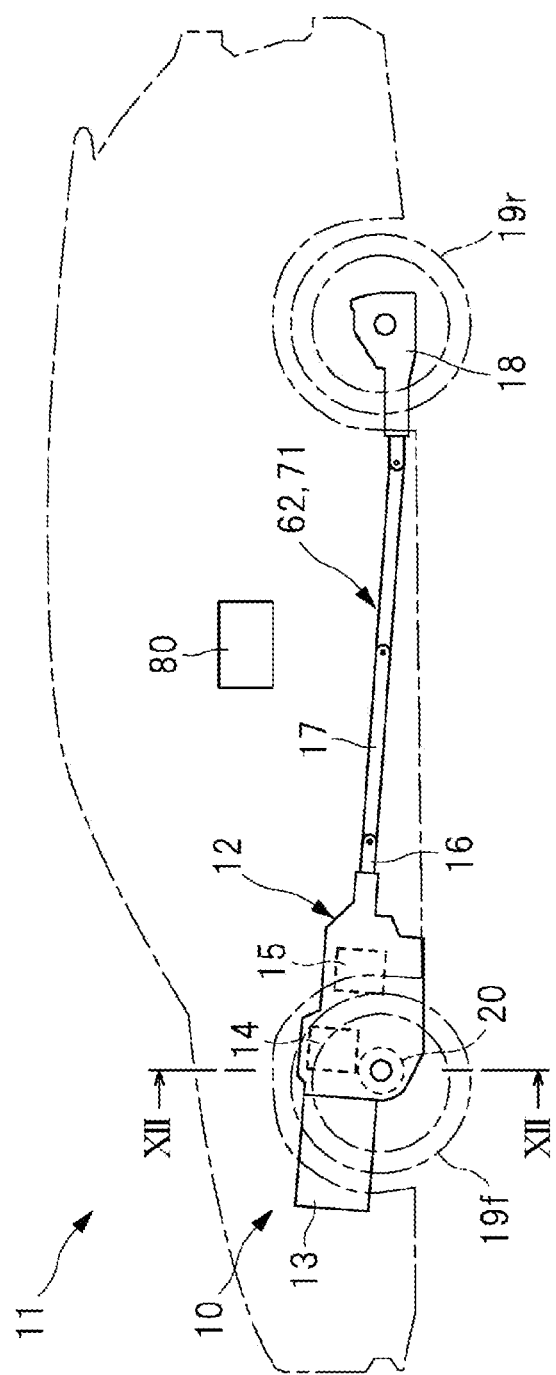
FIG. 1 illustrates an example configuration of a hybrid vehicle including a vehicle driving device according to an embodiment of the disclosure.

FIG. 1 illustrates an example configuration of a hybrid vehicle 11 including a vehicle driving device 10 according to an embodiment of the disclosure. As illustrated in FIG. 1, the vehicle driving device 10 including a power train 12 and other elements is mounted on the hybrid vehicle 11. The power train 12 includes an engine 13, a motor generator 14, and a transmission mechanism 15. A rear-wheel output shaft 16 in the power train 12 is coupled to rear wheels 19r via a propeller shaft 17 and a rear differential mechanism 18. Moreover, the power train 12 further incorporates a front differential mechanism 20. The front differential mechanism 20 is coupled to front wheels 19f. The power train 12 illustrated is an all-wheel drive power train that drives both the front wheels 19f and the rear wheels 19r, but it is not limited thereto. For example, the power train 12 may be a front-wheel-drive power train that drives the front wheels 19f alone or may be a rear-wheel-drive power train that drives the rear wheels 19r alone.

Figure 2:
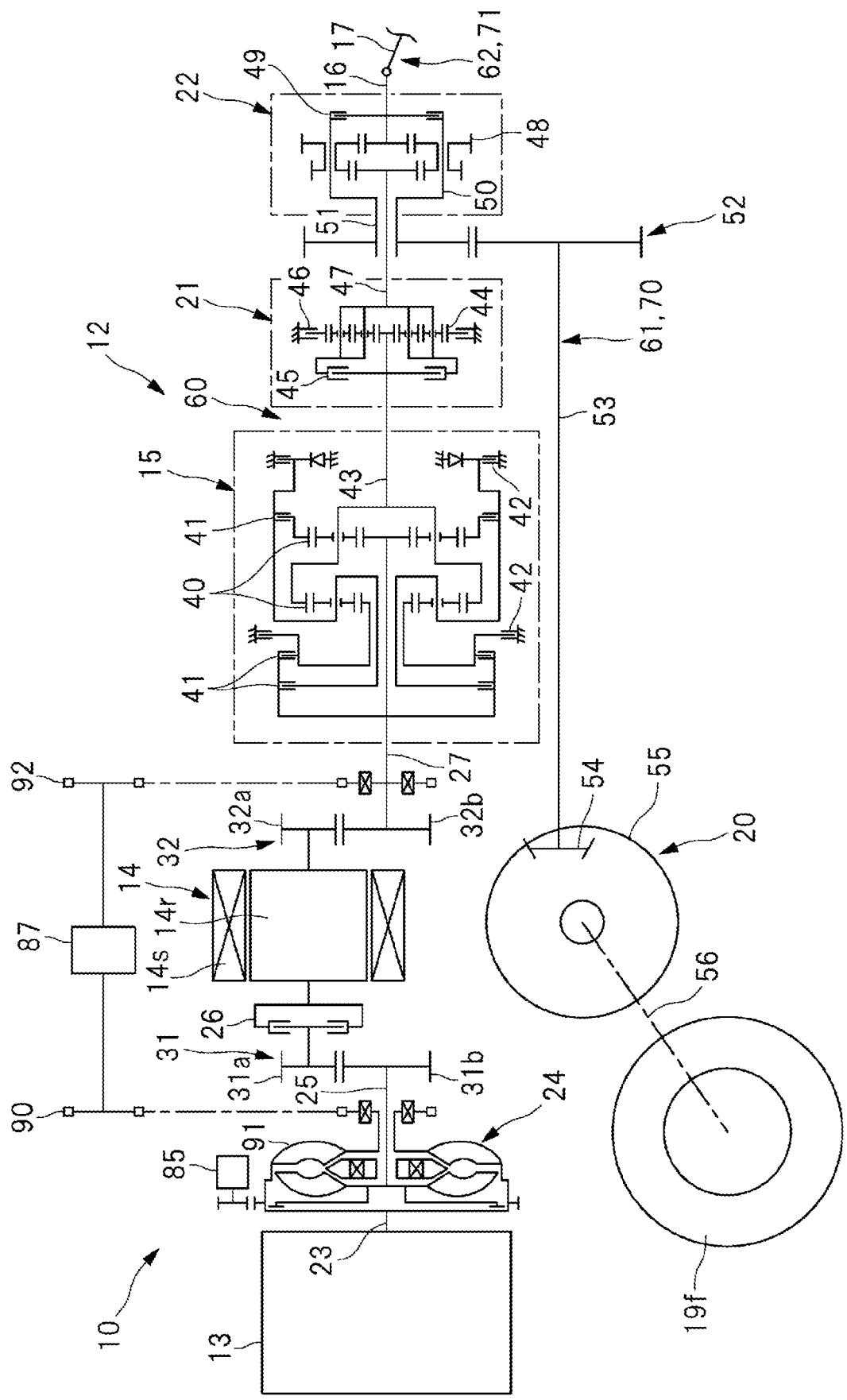
FIG. 2 illustrates an example configuration of a power train.

FIG. 2 illustrates an example configuration of the power train 12. As illustrated in FIG. 2, the power train 12 includes the engine 13, the motor generator 14, the transmission mechanism 15, a forward backward switching mechanism 21, and a center differential mechanism 22. A crankshaft 23 in the engine 13 is coupled to a torque converter 24. A turbine shaft 25 in the torque converter 24 is coupled to a rotor 14r in the motor generator 14 via a first gear train 31 and an engine clutch 26. The rotor 14r in the motor generator 14 is coupled to a transmission input shaft 27 in the transmission mechanism 15 via a second gear train 32. The transmission mechanism 15 illustrated is an automatic transmission mechanism including a plurality of planetary gear trains 40, a clutch 41, and a brake 42, but it is not limited thereto. The transmission mechanism 15 may be another transmission mechanism, such as a continuously variable transmission mechanism including a pair of pulleys.

A transmission output shaft 43 in the transmission mechanism 15 is coupled to the forward backward switching mechanism 21 including a planetary gear train 44, a forward clutch 45, and a backward brake 46. A forward backward output shaft 47 in the forward backward switching mechanism 21 is coupled to the center differential mechanism 22 including a composite planetary gear train 48 and a differential limit clutch 49. A hollow shaft 51 is disposed on a differential carrier 50 in the center differential mechanism 22. The hollow shaft 51 is coupled to a front-wheel output shaft 53 via a transfer gear train 52. A pinion 54 is disposed on an end of the front-wheel output shaft 53. The pinion 54 engages with a bevel gear 55 in the front differential mechanism 20. Moreover, a front shaft 56 extending from the front differential mechanism 20 is coupled to the front wheels 19f. The pinion 54 and the bevel gear 55 engaging with each other serve as a spiral bevel gear, which has curved teeth, or a hypoid (registered trade mark) gear. The rear-wheel output shaft 16 in the center differential mechanism 22 is coupled to the rear wheels 19r via the propeller shaft 17 and the rear differential mechanism 18, as illustrated in FIG. 1 described above.

Figure 3:
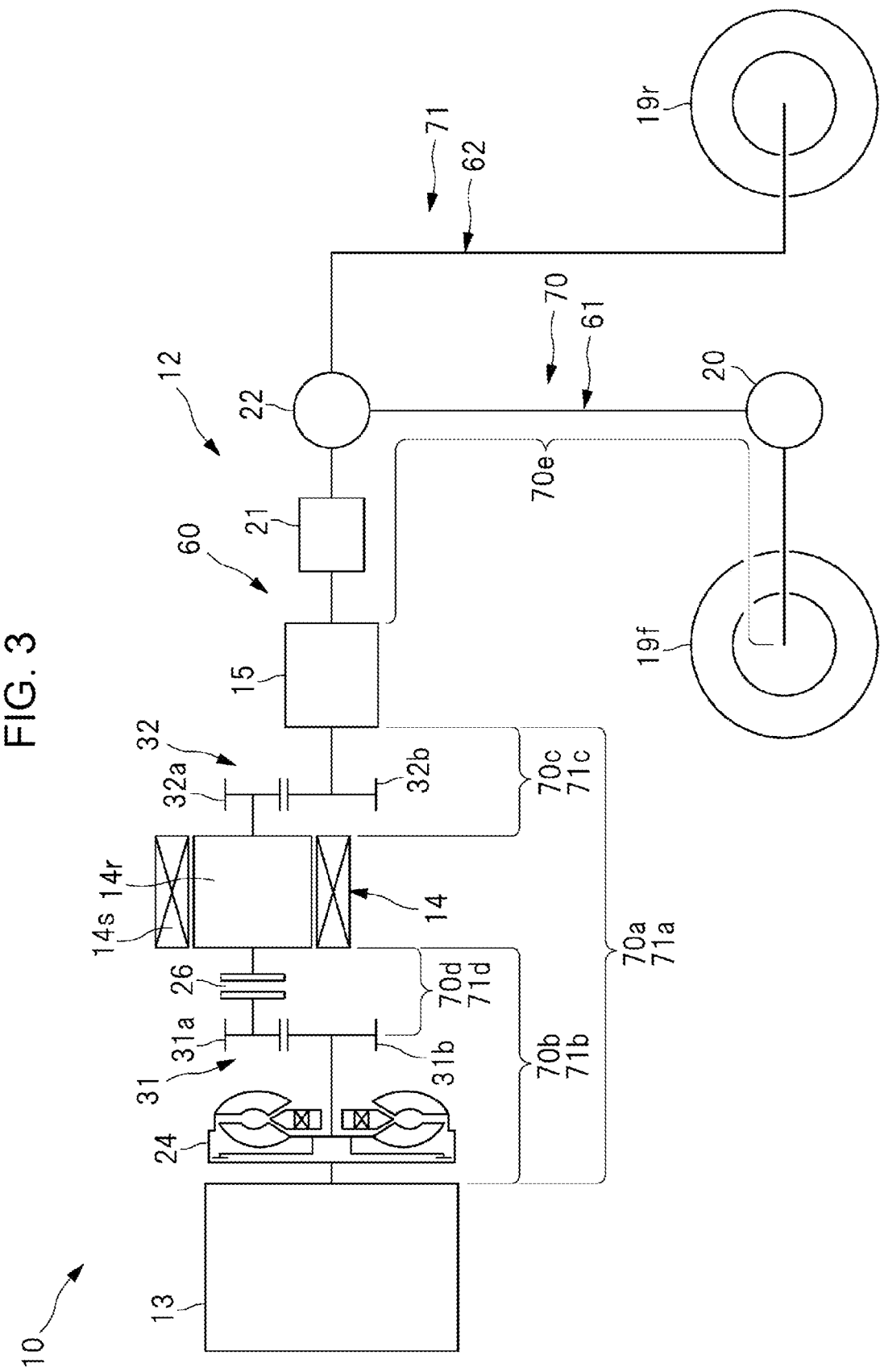
FIG. 3 schematically illustrates a configuration of the vehicle driving device.

FIG. 3 schematically illustrates a configuration of the vehicle driving device 10. As illustrated in FIG. 3, the engine 13 and the center differential mechanism 22 are coupled to each other via a power transmission path 60. The power transmission path 60 includes the torque converter 24, the first gear train 31, the engine clutch 26, the motor generator 14, the second gear train 32, the transmission mechanism 15, the forward backward switching mechanism 21, and other elements. The center differential mechanism 22 and the front wheels 19f are coupled to each other via a power transmission path 61. The power transmission path 61 includes the transfer gear train 52, the front-wheel output shaft 53, the front differential mechanism 20, and other elements. Moreover, the center differential mechanism 22 and the rear wheels 19r are coupled to each other via a power transmission path 62. The power transmission path 62 includes the propeller shaft 17, the rear differential mechanism 18, and other elements.

In other words, the engine 13 and the front wheels 19f are coupled to each other via a power transmission path 70, and the power transmission path 70 includes the power transmission paths 60 and 61. In one embodiment, the front wheels 19f may serve as "wheels". The transmission mechanism 15 is on the power transmission path 70. The power transmission path 70 includes a path 70a coupling the engine 13 and the transmission mechanism 15, and the motor generator 14 is on the path 70a. The power transmission path 70 includes a path 70b coupling the engine 13 and the motor generator 14, and the first gear train 31 is on the path 70b. The power transmission path 70 includes a path 70c coupling the motor generator 14 and the transmission mechanism 15, and the second gear train 32 is on the path 70c. Moreover, the power transmission path 70 includes a path 70d coupling the first gear train 31 and the motor generator 14, and the engine clutch 26 is on the path 70d. In one embodiment, the engine clutch 26 may serve as a "clutch mechanism". The power transmission path 70 includes a path 70e coupling the transmission mechanism 15 and the front wheels 19f, and the front differential mechanism 20 is on the path 70e. In one embodiment, the front differential mechanism 20 may serve as a "differential mechanism".

Similarly, the engine 13 and the rear wheels 19r are coupled to each other via a power transmission path 71, and the power transmission path 71 includes the power transmission paths 60 and 62. In one embodiment, the rear wheels 19r may serve as "wheels". The transmission mechanism 15 is on the power transmission path 71. The power transmission path 71 includes a path 71a coupling the engine 13 and the transmission mechanism 15, and the motor generator 14 is on the path 71a. The power transmission path 71 includes a path 71b coupling the engine 13 and the motor generator 14, and the first gear train 31 is on the path 71b. The power transmission path 71 includes a path 71c coupling the motor generator 14 and the transmission mechanism 15, and the second gear train 32 is on the path 71c. Moreover, the power transmission path 71 includes a path 71d coupling the first gear train 31 and the motor generator 14, and the engine clutch 26 is on the path 71d.

The first gear train 31 on the paths 70b and 71b, which couple the engine 13 and the motor generator 14, includes a first small-diameter gear 31a coupled to the motor generator 14 via the engine clutch 26 and a first large-diameter gear 31b coupled to the engine 13 via the torque converter 24. In one embodiment, the first gear train 31 may serve as a "first power transmission mechanism", the first small-diameter gear 31a may serve as a "first small-diameter rotator", and the first large-diameter gear 31b may serve as a "first large-diameter rotator". The first small-diameter gear 31a and the first large-diameter gear 31b constituting the first gear train 31 engage with each other, and the engine 13 and the motor generator 14 are coupled to each other via the first gear train 31. Because the number of teeth of the first large-diameter gear 31b is larger than that of the first small-diameter gear 31a, the rotational speed of the motor generator 14 (hereinafter referred to as motor RPM) is higher than the rotational speed of the engine 13 (hereinafter referred to as engine RPM). For example, the gear ratio of the first gear train 31 may be set at 0.5.

The second gear train 32 on the paths coupling the motor generator 14 and the transmission mechanism 15 includes a second small-diameter gear 32a coupled to the rotor 14r in the motor generator 14 and a second large-diameter gear 32b coupled to the transmission input shaft 27 in the transmission mechanism 15. In one embodiment, the second gear train 32 may serve as a "second power transmission mechanism", the second small-diameter gear 32a may serve as a "second small-diameter rotator", and the second large-diameter gear 32b may serve as a "second large-diameter rotator". The second small-diameter gear 32a and the second large-diameter gear 32b constituting the second gear train 32 engage with each other, and the motor generator 14 and the transmission mechanism 15 are coupled to each other via the second gear train 32. Because the number of teeth of the second large-diameter gear 32b is larger than that of the second small-diameter gear 32a, the motor RPM is higher than the rotational speed of the transmission input shaft 27 (hereinafter referred to as transmission input RPM). For example, the gear ratio of the second gear train 32 may be set at 2.0.

Figure 4:
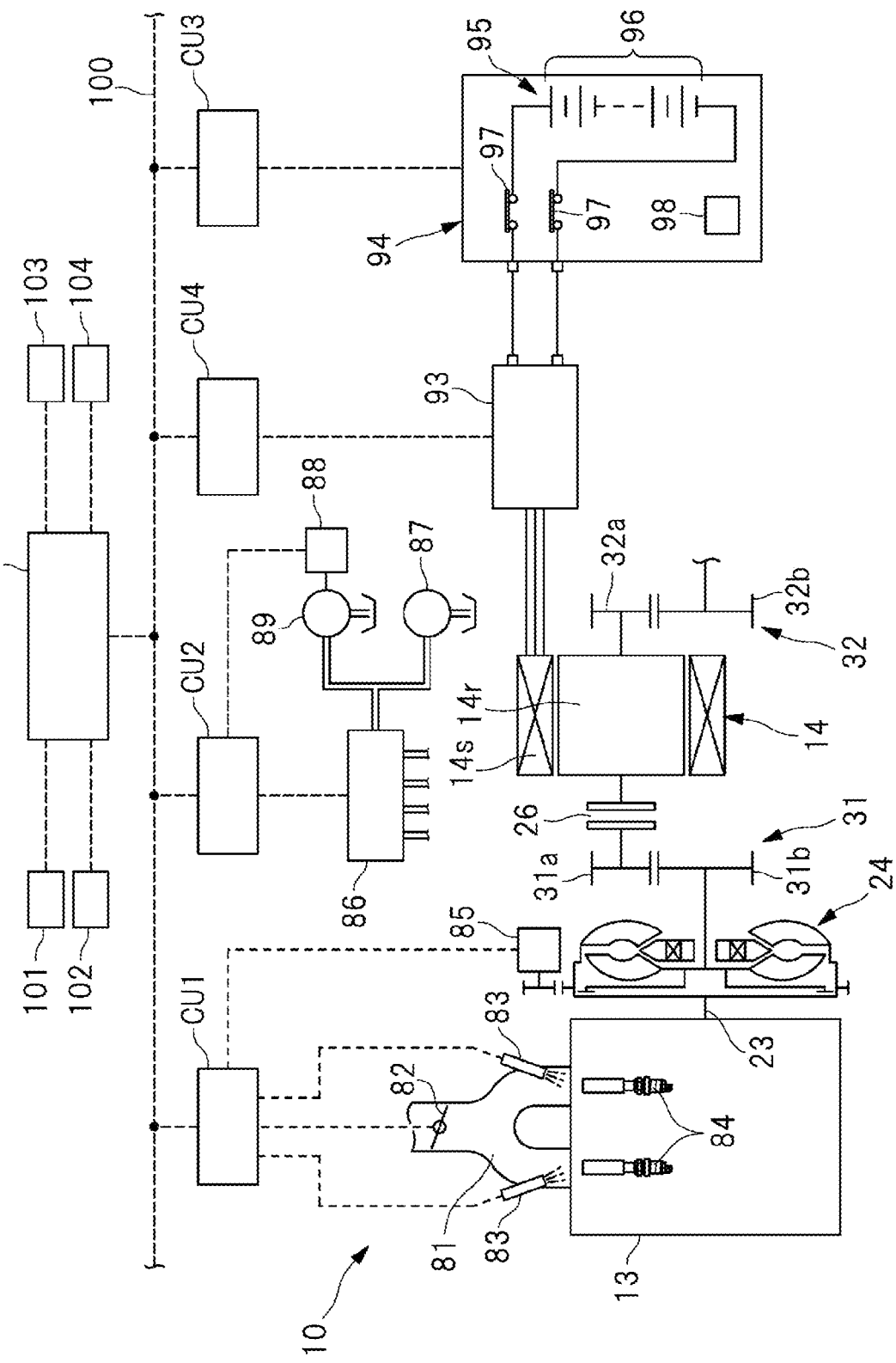
FIG. 4 illustrates an example of the power train and a control system included in the vehicle driving device.

FIG. 4 illustrates an example of the power train 12 and a control system 80 included in the vehicle driving device 10. As illustrated in FIG. 4, a throttle valve 82 configured to adjust the amount of intake air is disposed on an intake manifold 81 in the engine 13. An injector 83 configured to inject fuel into an intake port or a cylinder is disposed on the engine 13, and an ignition device 84 including an igniter, an ignition plug, and other elements is disposed on the engine 13. Moreover, a starter motor 85 configured to start and rotate the crankshaft 23 through the torque converter 24 is disposed on the engine 13. An engine control unit CU1 being an electronic control unit is connected to the throttle valve 82, the injector 83, the ignition device 84, the starter motor 85, and other elements to control the working state of the engine 13.

As illustrated in FIG. 4, a valve unit 86 including a plurality of electromagnetic valves, oil channels, and other elements is disposed on the power train 12 to control the engine clutch 26, the transmission mechanism 15, and other elements in the power train 12. An oil pump 87 that can be driven by the engine 13 and the transmission input shaft 27 is disposed on the power train 12, and an oil pump 89 that can be driven by an electric motor 88 is disposed on the power train 12. A destination, pressure, and other factors of hydraulic fluid discharged from the oil pumps 87 and 89 are controlled by the valve unit 86, and the hydraulic fluid is supplied to the engine clutch 26, the transmission mechanism 15, and other elements. A transmission control unit CU2 being an electronic control unit is connected to the valve unit 86 and the electric motor 88 to control the action state of the power train 12 by using the valve unit 86 and to control the action state of the oil pump 89 by using the electric motor 88.

As illustrated in FIG. 2, the oil pump 87 is coupled to a pump shell 91 in the torque converter 24 via a chain mechanism 90 including a one-way clutch. The oil pump 87 is coupled to the transmission input shaft 27 via a chain mechanism 92 including a one-way clutch. When the engine 13 is in the working state, a driving force is transmitted from the pump shell 91 through the chain mechanism 90 to the oil pump 87. Even though the engine 13 is inactive, when the transmission input shaft 27 rotates, the driving force is transmitted from the transmission input shaft 27 through the chain mechanism 92 to the oil pump 87.

As illustrated in FIG. 4, the motor generator 14 is coupled to a battery module 94 via an inverter 93. The battery module 94 incorporates a plurality of battery cells 96 constituting a battery 95, such as a lithium ion battery. Moreover, a main relay 97 configured to open or close an energization line is disposed on the battery module 94, and a battery sensor 98 configured to detect a charge or discharge current, a terminal voltage, a temperature, and other elements of the battery 95 is disposed on the battery module 94. The battery module 94 is connected to a battery control unit CU3 being an electronic control unit. The battery control unit CU3 has the functions of monitoring the charge or discharge of the battery 95 and of controlling the main relay 97 and other elements. The battery control unit CU3 has the function of calculating the state of charge (SOC) indicating the charge state of the battery 95, based on the charge or discharge current, the terminal voltage, and other factors detected by the battery sensor 98. The SOC of the battery 95 is the percentage indicating the quantity of electricity remaining in the battery 95 and the percentage of the quantity of electricity stored to the full charge capacity of the battery 95.

As illustrated in FIG. 4, the inverter 93, which is connected to a stator 14s in the motor generator 14, is connected to a motor control unit CU4 being an electronic control unit. The motor control unit CU4 controls the action state of the motor generator 14 by controlling the inverter 93, including a plurality of switching elements and other elements. When the motor generator 14 is controlled to operate in a power running state, a direct-current power from the battery 95 is converted by the inverter 93 into an alternating-current power, which is supplied to the stator 14s. When the motor generator 14 is controlled to operate in a power generation state, an alternating-current power from the stator 14s is converted by the inverter 93 into a direct-current power, which is supplied to the battery 95.

As illustrated in FIG. 4, the vehicle driving device 10 includes the control system 80 including the plurality of electronic control units to control the power train 12. Examples of the electronic control units included in the control system 80 are the above-described engine control unit CU1, transmission control unit CU2, battery control unit CU3, and motor control unit CU4. Another example electronic control unit included in the control system 80 is a vehicle control unit CU5 configured to output a control signal to each of the control units CU1 to CU4. These control units CU1 to CU5 are connected to each other via an onboard network 100, such as a controller area network (CAN), and can communicate with each other.

The vehicle control unit CU5 sets target working for the power train 12, based on information received from the control units CU1 to CU4 and various sensors described below. The vehicle control unit CU5 generates control signals corresponding to the target working for the power train 12 and outputs the control signals to the control units. Examples of the sensors connected to the vehicle control unit CU5 are a vehicle speed sensor 101 configured to detect the vehicle speed being the running speed of the hybrid vehicle 11, an accelerator sensor 102 configured to detect the amount of operation of an accelerator pedal, and a brake sensor 103 configured to detect the amount of operation of a brake pedal. The vehicle control unit CU5 is connected to a start switch 104 operable by a driver to activate the control system 80.

Figure 5:
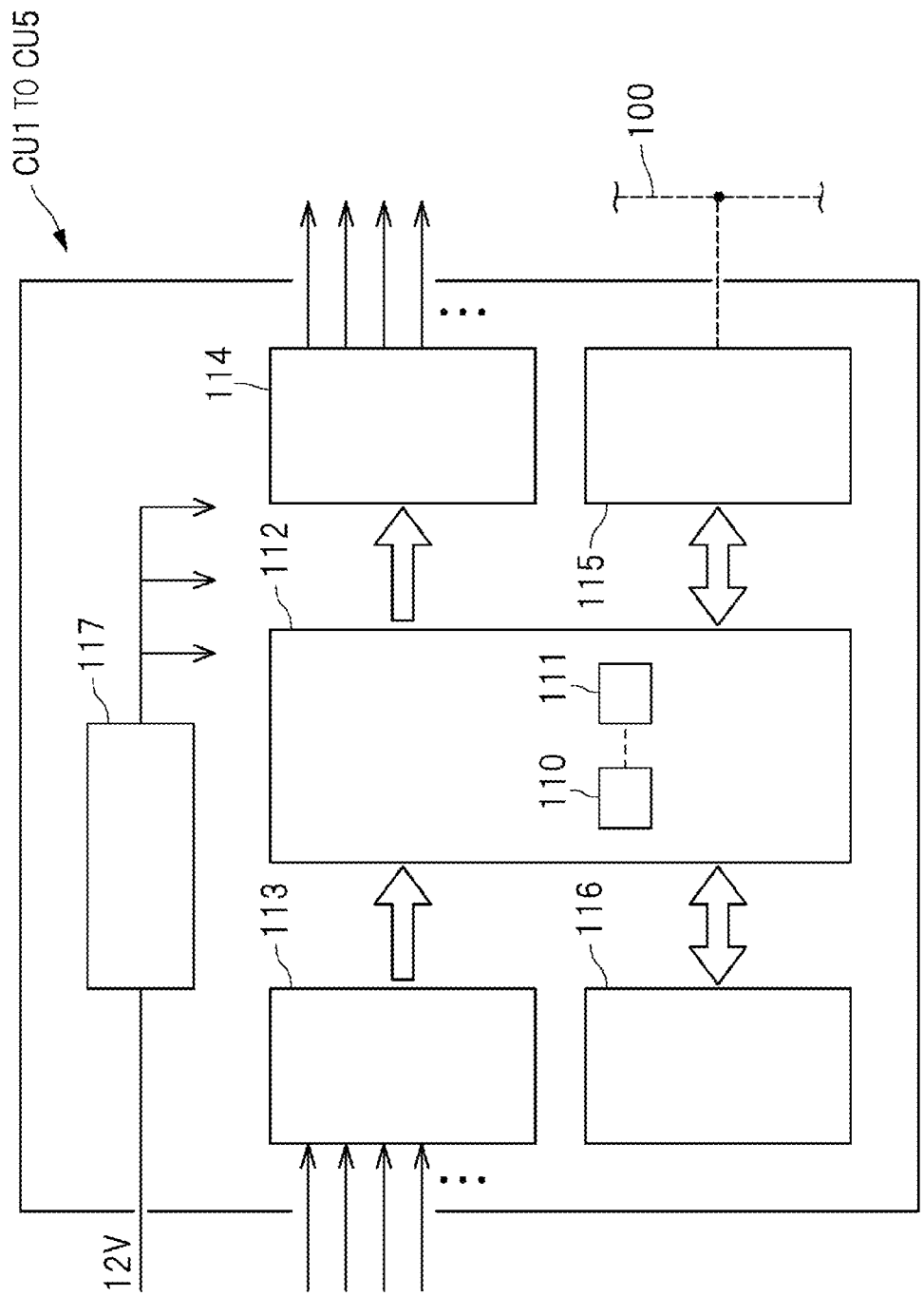
FIG. 5 schematically illustrates a basic structure of each control unit.

FIG. 5 schematically illustrates a basic structure of each of the control units CU1 to CU5. As illustrated in FIG. 5, each of the control units CU1 to CU5 includes a microcontroller 112 incorporating a processor 110, a memory 111, and other elements. The memory 111 stores predetermined programs, and a set of instructions for the programs is executable by the processor 110. The processor 110 and the memory 111 are connected to each other and can communicate with each other. In the illustrated example, the microcontroller 112 incorporates the single processor 110 and the single memory 111. It is not limited to that example. The microcontroller 112 may incorporate a plurality of processors 110. The microcontroller 112 may incorporate a plurality of memories 111.

Each of the control units CU1 to CU5 includes an input conversion circuit 113, a driving circuit 114, a communication circuit 115, an external memory 116, a power supply circuit 117, and other elements. The input conversion circuit 113 converts signals received from various sensors into signals that can be input into the microcontroller 112. The driving circuit 114 generates a driving signal to an actuator, such as the valve unit 86 described above or the like, based on a signal output from the microcontroller 112. The communication circuit 115 converts a signal output from the microcontroller 112 into a communication signal for another control unit. The communication circuit 115 converts a communication signal received from another control unit into a signal that can be input into the microcontroller 112. Moreover, the power supply circuit 117 supplies a stable power supply voltage to the microcontroller 112, the input conversion circuit 113, the driving circuit 114, the communication circuit 115, the external memory 116, and other elements. The external memory 116, such as a nonvolatile memory, stores data that remains even in a nonenergized state.

Figure 6:
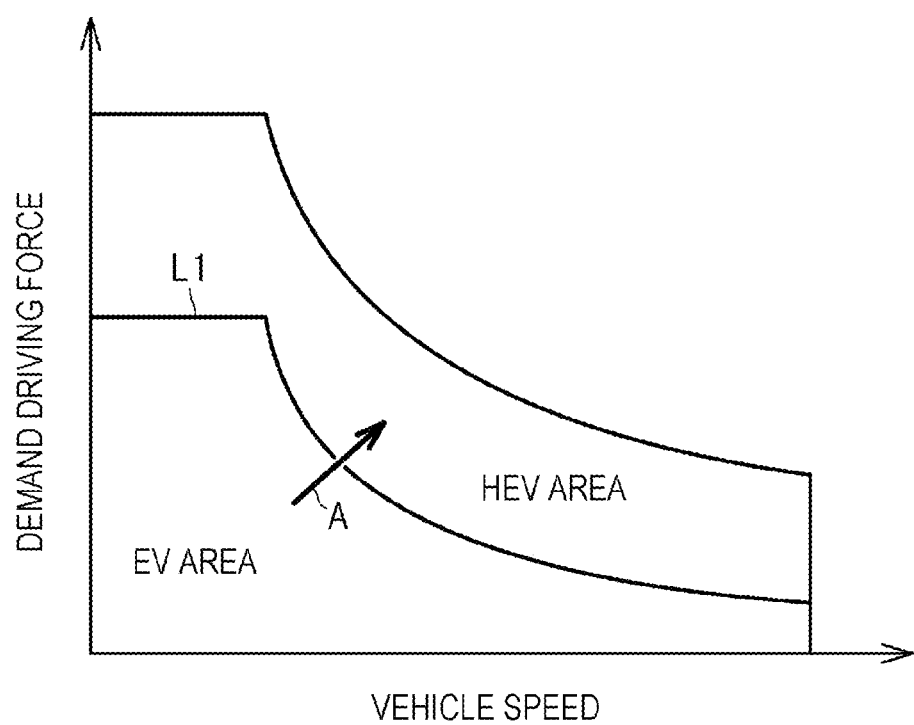
FIG. 6 is a running mode map that illustrates an example of execution areas for an EV mode and an HEV mode.
Figure 7:
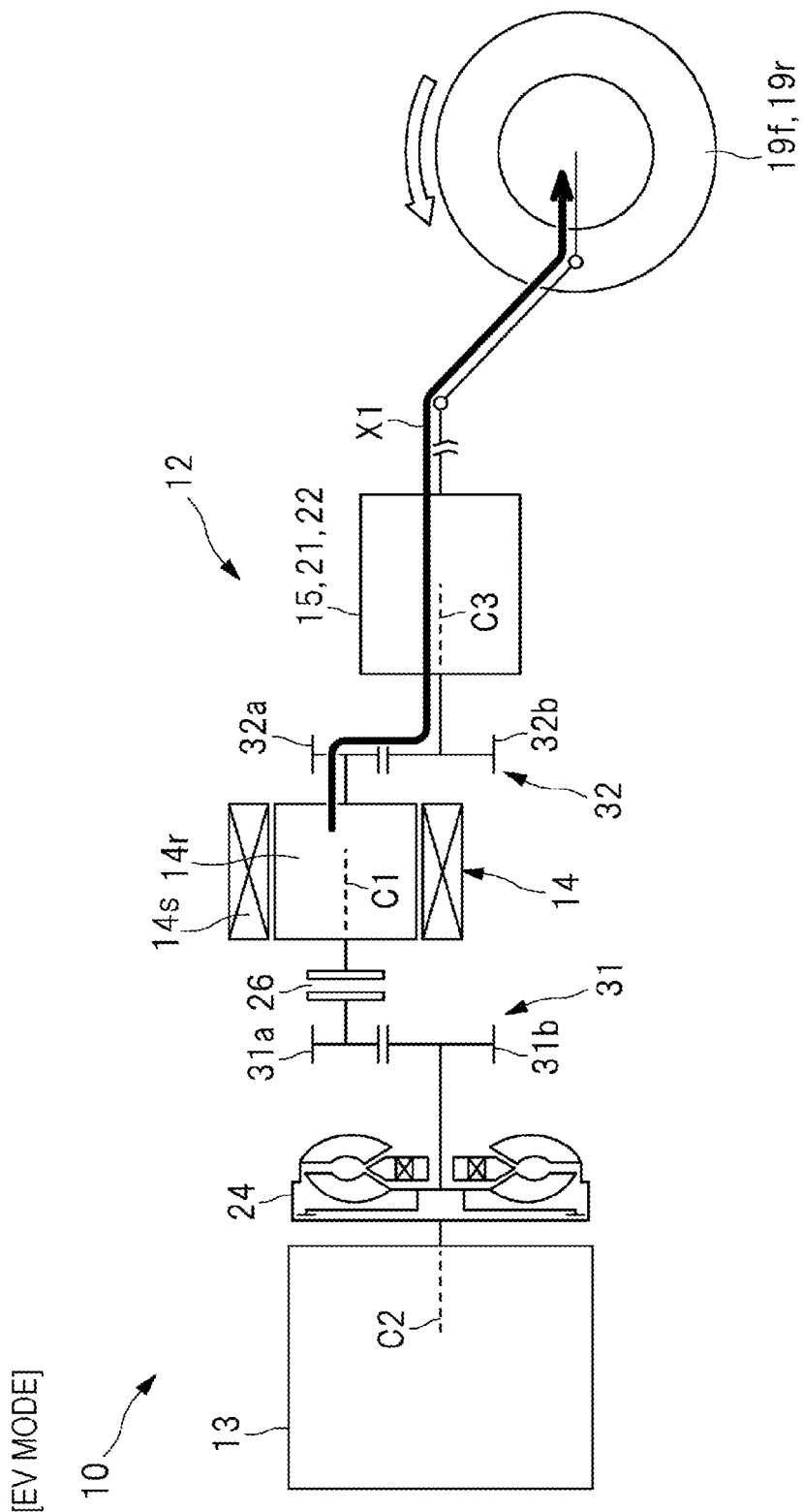
FIG. 7 illustrates an execution status in the EV mode.
Figure 8:
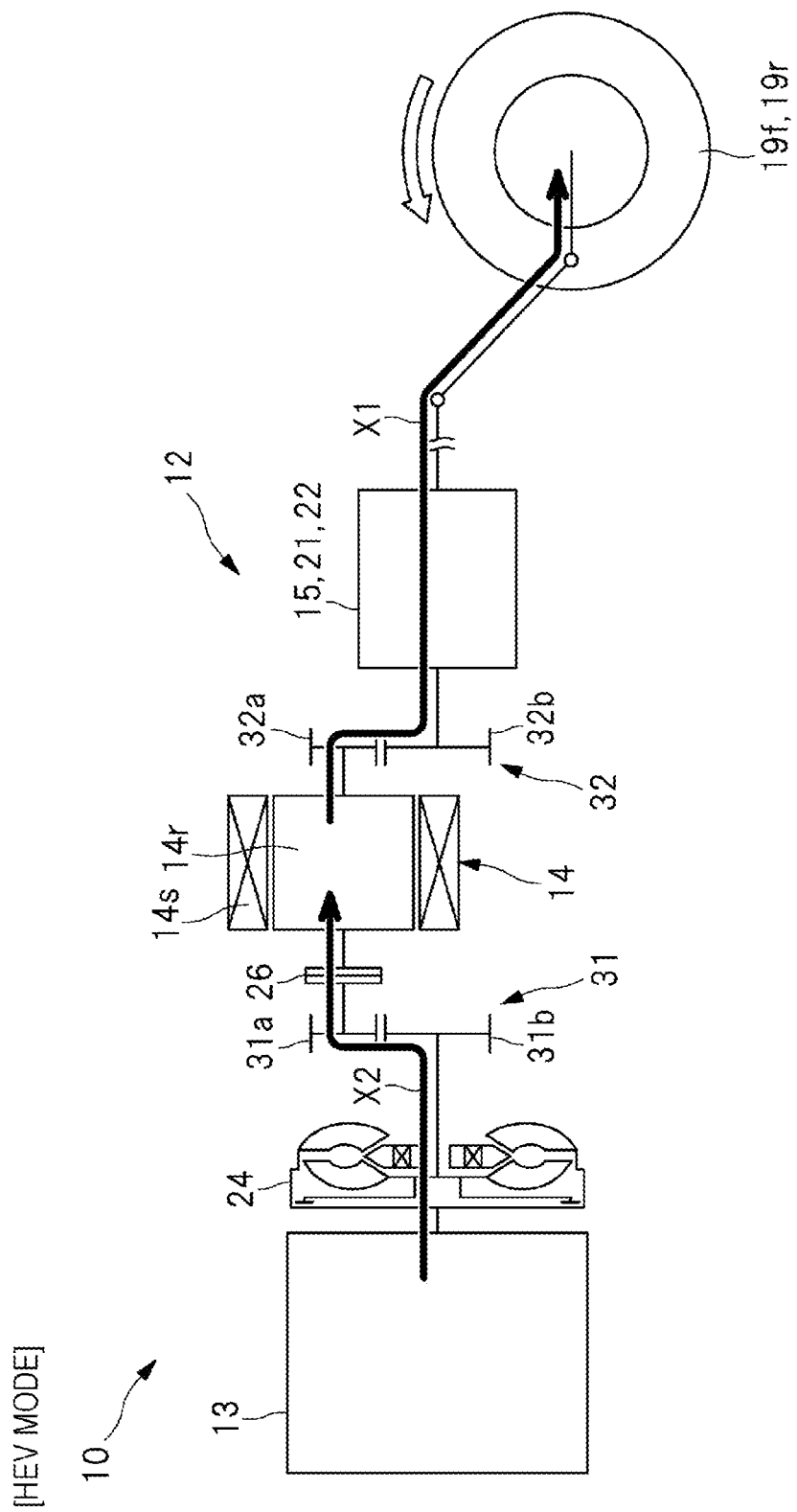
FIG. 8 illustrates an execution status in the HEV mode.
Figure 9:
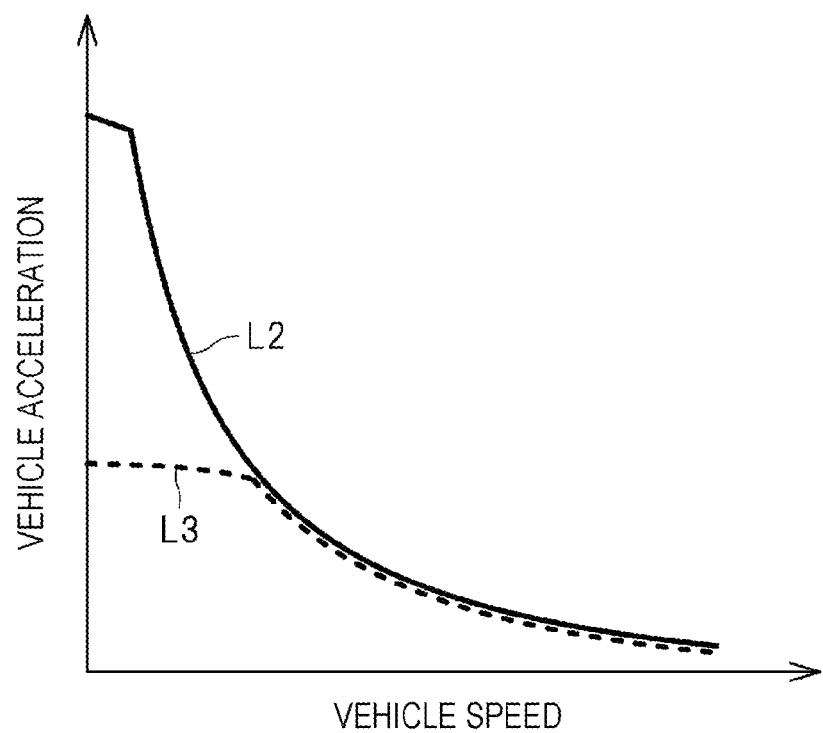
FIG. 9 illustrates a vehicle acceleration in the EV mode.
Figure 10:
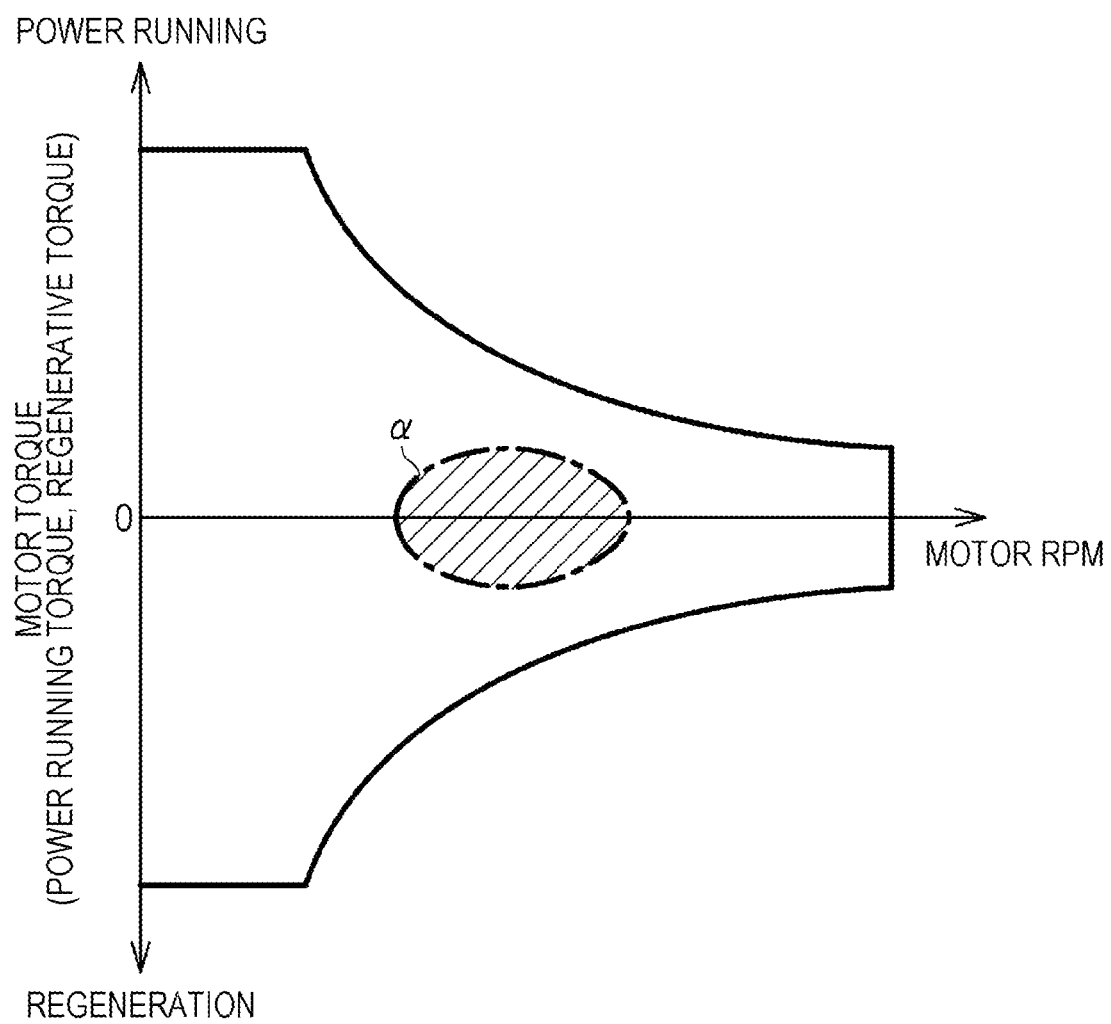
FIG. 10 illustrates a high-efficiency operation area of a motor generator.

FIG. 6 is a running mode map that illustrates an example of execution areas for an electric vehicle (EV) mode and a hybrid electric vehicle (HEV) mode. FIG. 7 illustrates an execution status in the EV mode, and FIG. 8 illustrates an execution status in the HEV mode. FIG. 9 illustrates a vehicle acceleration in the EV mode. FIG. 10 illustrates a high-efficiency operation area for the motor generator 14.

The control system 80 has the EV mode and the HEV mode as the running mode. The EV mode is a running mode at which the engine 13 is inactive and the motor generator 14 is active. The HEV mode is a running mode at which the engine 13 and the motor generator 14 are active. As illustration FIG. 6, in the running mode map, a boundary line L1 between the execution area for the EV mode and that for the HEV mode is set. The demand driving force illustrated in FIG. 6 is the driving force demanded of the power train 12. For example, the control system 80 can set the demand driving force based on the accelerator opening degree being the amount of operation of the accelerator pedal. That is, the demand driving force increases with increase in the accelerator opening degree, whereas the demand driving force reduces with reduction in the accelerator opening degree.

As illustrated in FIG. 6, when the operation area based on the demand driving force and the vehicle speed is the EV area, which is below the boundary line L1, the EV mode is selected by the control system 80. As illustrated in FIG. 7, when the EV mode is selected, the control system 80 controls the engine clutch 26 to be in a disengaged state, controls the engine 13 to be in a standstill state, and controls the motor generator 14 to operate in the power running state. Thus, as indicated by an arrow X1 in FIG. 7, a power running torque from the motor generator 14 (hereinafter referred to as motor torque) can be transmitted to the front and rear wheels 19f and 19r, and the hybrid vehicle 11 is enabled to run by using the motor generator 14. When the speed of the hybrid vehicle 11 is reduced, the motor generator 14 is controlled to operate in a regenerative power generation state, kinetic energy of the hybrid vehicle 11 is converted into electric energy, which is stored in the battery 95.

Here, the motor generator 14 and the transmission mechanism 15 are coupled to each other via the second gear train 32. Thus, because the motor torque can be increased by the second gear train 32, the acceleration performance, that is, power performance in the EV mode can be enhanced while an increase in the size of the motor generator 14 is suppressed. In other words, as indicated by a solid line L2 in FIG. 9, the vehicle acceleration in a low vehicle speed area can be drastically increased. A broken line L3 in FIG. 9 indicates the vehicle acceleration of a hybrid vehicle in which the motor generator 14 and the transmission mechanism 15 are directly coupled to each other, that is, the vehicle acceleration of a hybrid vehicle that does not include the second gear train 32.

Because the motor generator 14 and the transmission mechanism 15 are coupled to each other via the second gear train 32, the motor RPM can be increased from the low vehicle speed area. Here, as indicated by hatching in FIG. 10, the energy efficiency of the motor generator 14 in a high rpm area α is higher than that in a low rpm area. That is, when the motor RPM is increased by using the second gear train 32, the motor generator 14 can be controlled while being close to the high rpm area α from the low vehicle speed area. Thus, the energy efficiency of the motor generator 14 can be enhanced, and the fuel efficiency performance of the hybrid vehicle 11 can be enhanced.

As illustrated in FIG. 6, when the operation area based on the demand driving force and the vehicle speed is the HEV area, which is above the boundary line L1, the HEV mode is selected by the control system 80. As illustrated in FIG. 8, when the HEV mode is selected, the control system 80 controls the engine clutch 26 to operate in an engaged state, controls the engine 13 to operate in the working state, and controls the motor generator 14 to operate in the power running state. Thus, as indicated by the arrow X1 and an arrow X2 in FIG. 8, an engine torque and the motor torque can be transmitted to the front and rear wheels 19f and 19r, and the hybrid vehicle 11 is enabled to run by using the engine 13 and the motor generator 14. When the speed of the hybrid vehicle 11 is reduced, the motor generator 14 is controlled to operate in the regenerative power generation state, kinetic energy of the hybrid vehicle 11 is converted into electric energy, which is stored in the battery 95.

As described above, because the motor generator 14 and the transmission mechanism 15 are coupled to each other via the second gear train 32, the motor RPM can also be increased from the low vehicle speed area in the HEV mode, as in the case of the EV mode. That is, because the motor RPM can also be increased by the second gear train 32 in the HEV mode, the motor generator 14 can be controlled while being close to the high rpm area α from the low vehicle speed area. Thus, the energy efficiency of the motor generator 14 can be enhanced, and the fuel efficiency performance of the hybrid vehicle 11 can be enhanced.

Figure 11:
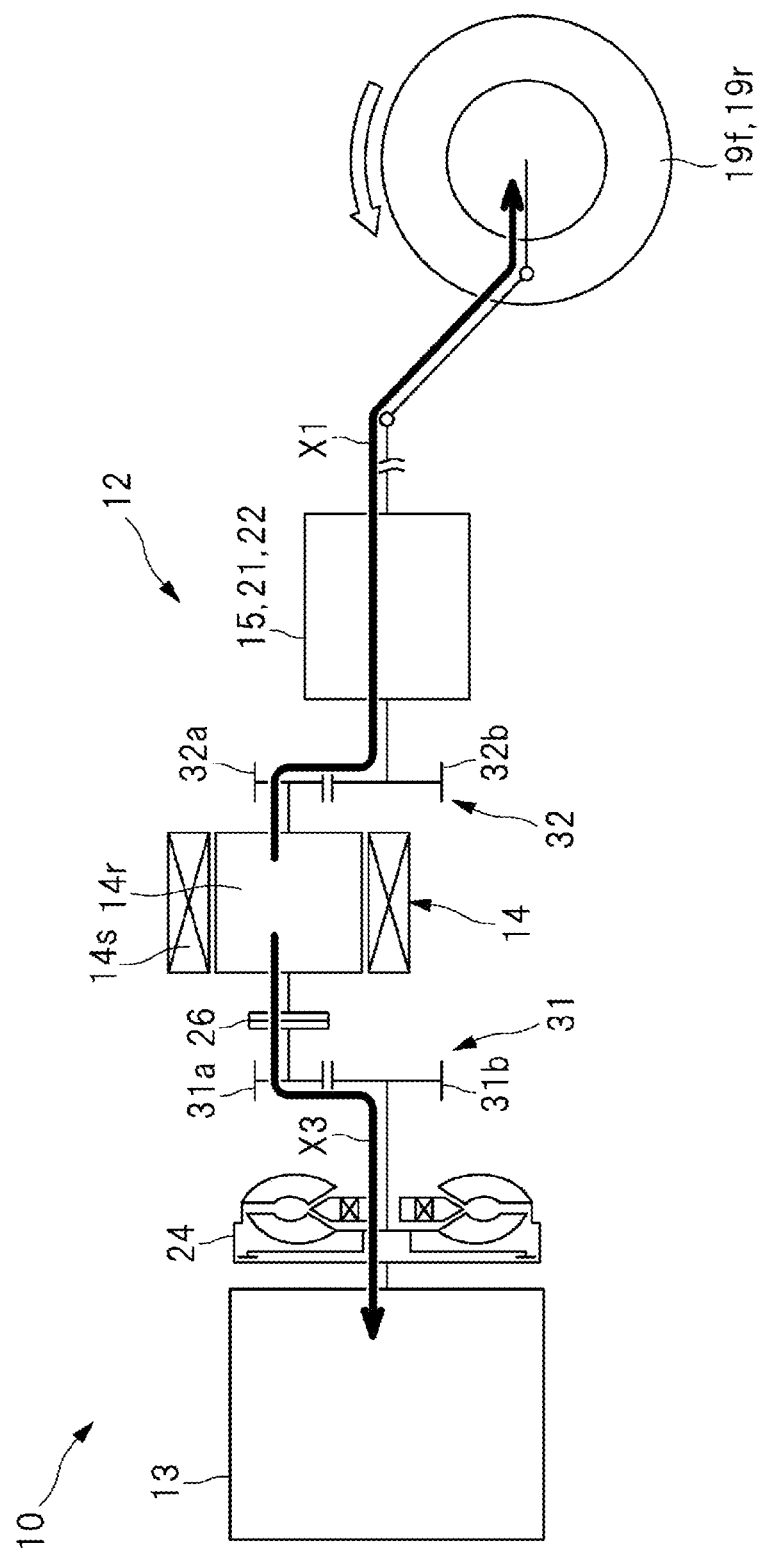
FIG. 11 illustrates an engine starting status in the EV mode.

As indicated by an arrow A in FIG. 6, while the demand driving force and vehicle speed is rising across the boundary line L1 in the EV mode, the control system 80 switches the running mode from the EV mode to the HEV mode by starting the engine 13 at standstill. Here, FIG. 11 illustrates an engine starting status in the EV mode. As illustrated in FIG. 11, when the control system 80 controls the engine clutch 26 to operate in the engaged state during running in the EV mode, the motor torque is transmitted from the motor generator 14 to the engine 13, as indicated by an arrow X3, and the engine 13 is started and rotated by the motor torque. Here, the engine 13 and the motor generator 14 are coupled to each other via the first gear train 31. Thus, because the motor torque can be increased by the first gear train 31, the engine starting performance in the EV mode can be enhanced while an increase in the size of the motor generator 14 is suppressed.

Figure 12:
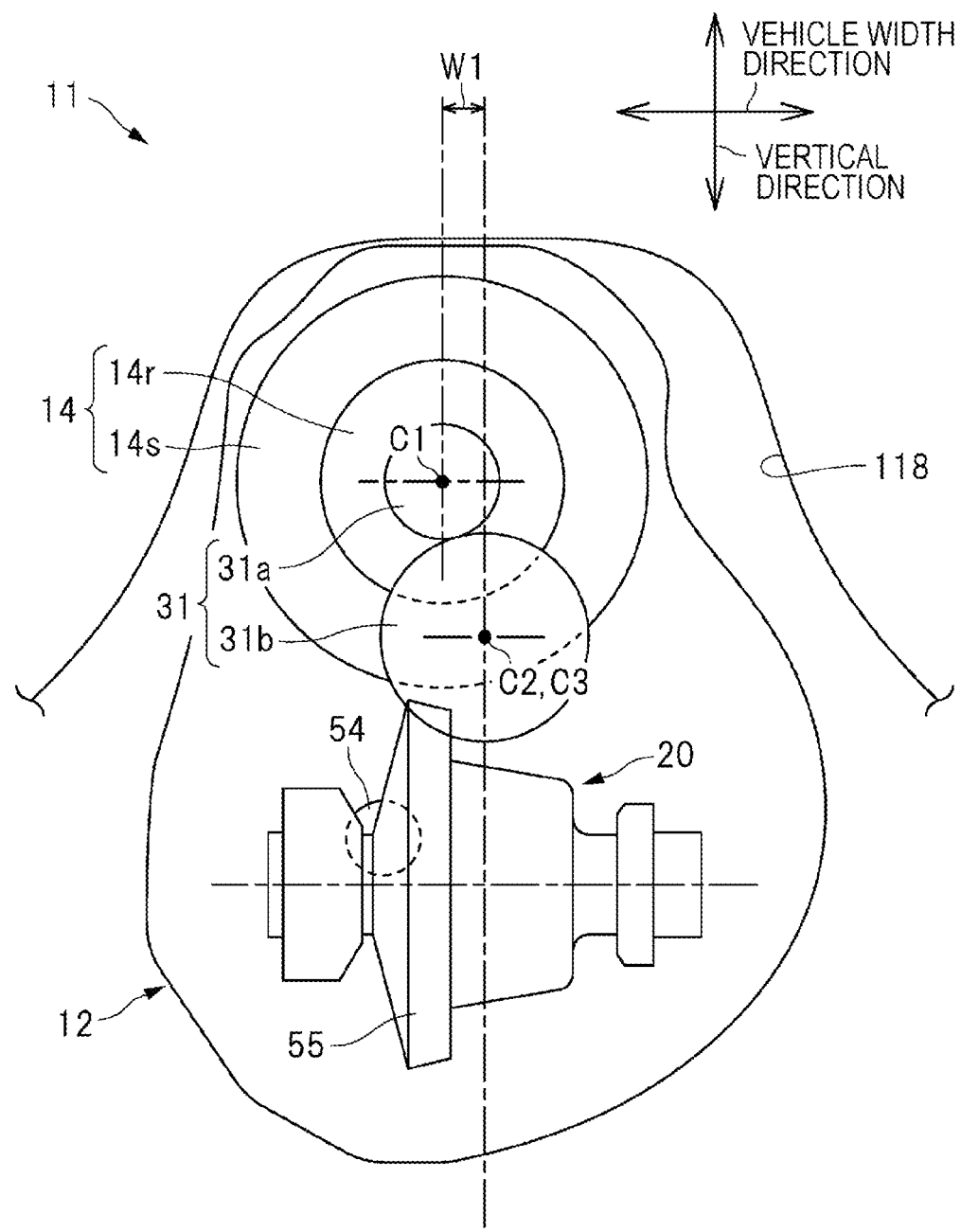
FIG. 12 is a sectional view taken along line XII-XII in FIG. 1 and schematically illustrating the power train.

FIG. 12 is a sectional view taken along line XII-XII in FIG. 1 and schematically illustrating the power train 12. As illustrated in FIG. 12, the power train 12 is mounted on the hybrid vehicle 11, and the power train 12 is housed in a floor tunnel 118 of the vehicle body. Because the engine 13 and the motor generator 14 are coupled to each other via the first gear train 31, a central axis C1 of rotation of the motor generator 14 is positioned above a central axis C2 of rotation of the engine 13 in the vertical direction. Thus, the front differential mechanism 20 can be disposed below the motor generator 14, the flexibility in designing the power train 12 from the viewpoint of ensuring the mountability can be increased.

Because the engine 13 and the motor generator 14 are coupled to each other via the first gear train 31, as indicated by a reference character W1, the central axis C2 of rotation of the engine 13 and the central axis C1 of rotation of the motor generator 14 are displaced from each other in the vehicle width direction. Because the motor generator 14 can be displaced from the engine 13 in the vehicle width direction, the motor generator 14 can be disposed without interference with the floor tunnel 118, an energization cable, and other elements. In that respect, therefore, the flexibility in designing the power train 12 can also be increased.

In the example illustrated in FIGS. 7, 12, and other drawings, the central axis C2 of rotation of the engine 13 and a central axis C3 of rotation of the transmission mechanism 15 coincide with each other. They are not limited to that example. The central axis C2 of rotation of the engine 13 and the central axis C3 of rotation of the transmission mechanism 15 may be displaced from each other. The central axis C2 of rotation of the engine 13 is an axis that coincides with the center line of the crankshaft 23. The central axis C1 of rotation of the motor generator 14 is an axis that coincides with the center line of the rotor 14r. The central axis C3 of rotation of the transmission mechanism 15 is an axis that coincides with the center line of the transmission input shaft 27.

The vehicle driving device is not limited to the vehicle driving device 10 having the structure illustrated in FIG. 2 and may be a vehicle driving device having another structure. FIGS. 13 to 16 illustrate vehicle driving devices 120, 130, 140, and 150, according to other embodiments.

Figure 13:
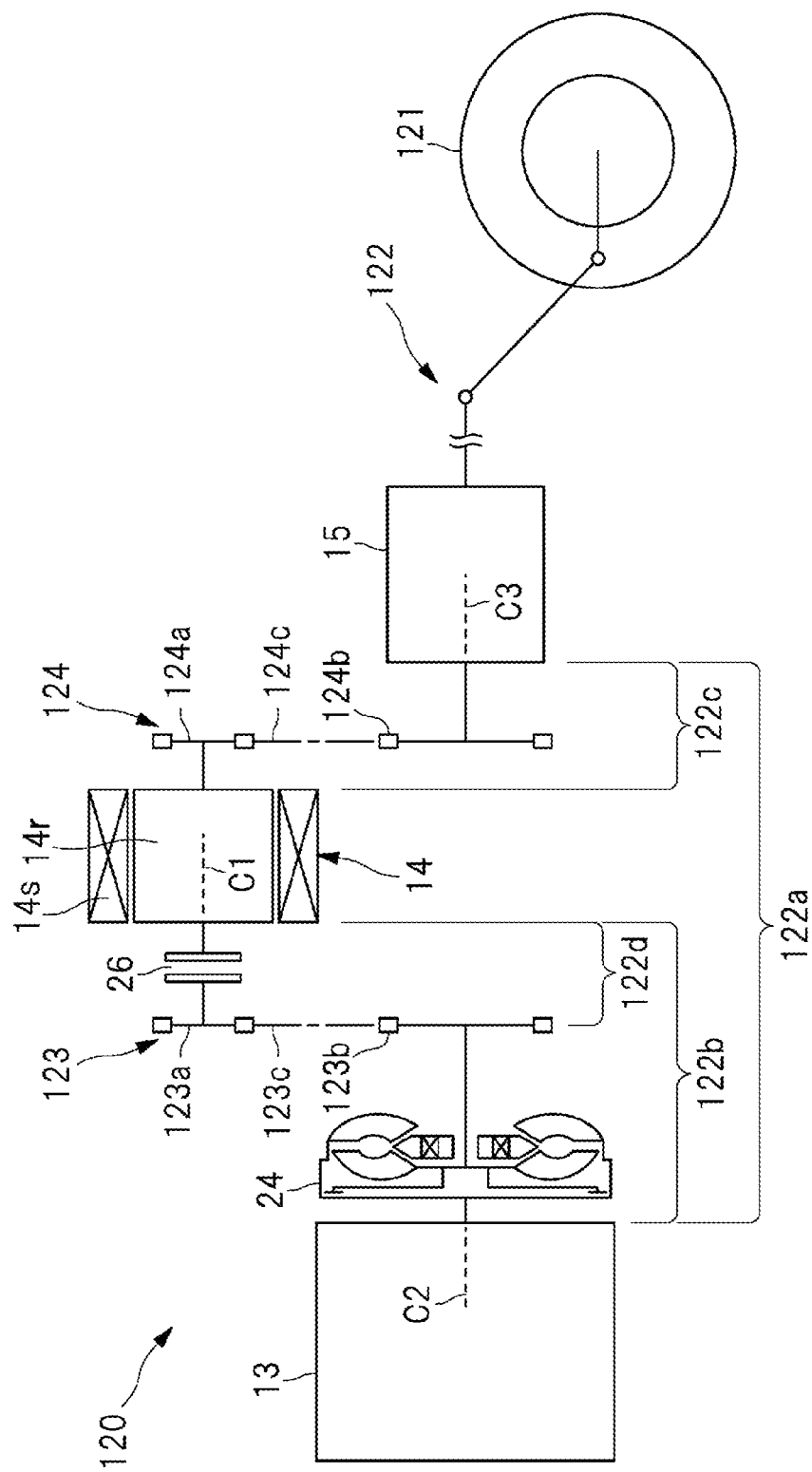
FIG. 13 illustrates a vehicle driving device according to another embodiment.

As illustrated in FIG. 13, the vehicle driving device 120 includes the engine 13, the motor generator 14, and the transmission mechanism 15. The engine 13 and wheels 121 are coupled to each other via a power transmission path 122. The transmission mechanism 15 is on the power transmission path 122. The power transmission path 122 includes a path 122a coupling the engine 13 and the transmission mechanism 15, and the motor generator 14 is on the path 122a. The power transmission path 122 includes a path 122b coupling the engine 13 and the motor generator 14, and a first chain mechanism 123 is on the path 122b. The power transmission path 122 includes a path 122c coupling the motor generator 14 and the transmission mechanism 15, and a second chain mechanism 124 is on the path 122c. Moreover, the power transmission path 122 includes a path 122d coupling the first chain mechanism 123 and the motor generator 14, and the engine clutch 26 is on the path 122d.

The first chain mechanism 123 on the path coupling the engine 13 and the motor generator 14 includes a first small-diameter sprocket 123a coupled to the motor generator 14 via the engine clutch 26 and a first large-diameter sprocket 123b coupled to the engine 13 via the torque converter 24. In one embodiment, the first chain mechanism 123 may serve as the "first power transmission mechanism", the first small-diameter sprocket 123a may serve as the "first small-diameter rotator", and the first large-diameter sprocket 123b may serve as the "first large-diameter rotator". A chain 123c is wound around the first small-diameter sprocket 123a and the first large-diameter sprocket 123b. The engine 13 and the motor generator 14 are coupled to each other via the first chain mechanism 123. Because the number of teeth of the first large-diameter sprocket 123b is larger than that of the first small-diameter sprocket 123a, the motor RPM is higher than the engine RPM.

The second chain mechanism 124 on the path coupling the motor generator 14 and the transmission mechanism 15 includes a second small-diameter sprocket 124a coupled to the rotor 14r in the motor generator 14 and a second large-diameter sprocket 124b coupled to the transmission input shaft 27 in the transmission mechanism 15. In one embodiment, the second chain mechanism 124 may serve as the "second power transmission mechanism", the second small-diameter sprocket 124a may serve as the "second small-diameter rotator", and the second large-diameter sprocket 124b may serve as the "second large-diameter rotator". A chain 124c is wound around the second small-diameter sprocket 124a and the second large-diameter sprocket 124b. The motor generator 14 and the transmission mechanism 15 are coupled to each other via the second chain mechanism 124. Because the number of teeth of the second large-diameter sprocket 124b is larger than that of the second small-diameter sprocket 124a, the motor RPM is higher than the transmission input RPM.

The vehicle driving device 120 including the first and second chain mechanisms 123 and 124 can function similarly to the vehicle driving device 10 described above. That is, the power performance of the hybrid vehicle 11 can be enhanced without increasing the size of the motor generator 14. Additionally, the engine starting performance can be enhanced without increasing the size of the motor generator 14. Moreover, the central axis C1 of rotation of the motor generator 14 and the central axis C2 of rotation of the engine 13 can be displaced from each other, and the flexibility in designing the vehicle driving device 120 can be increased.

Figure 14:
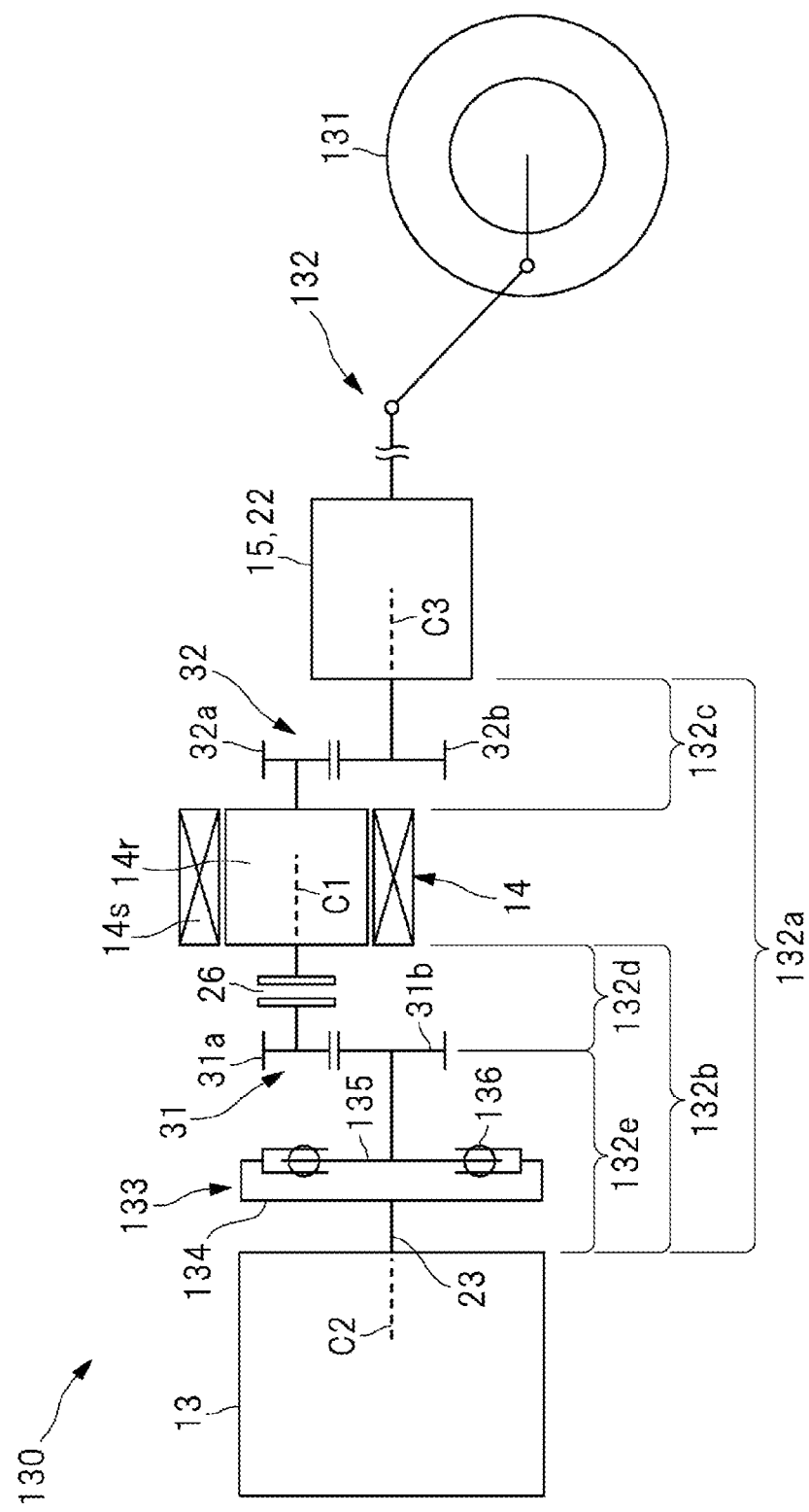
FIG. 14 illustrates a vehicle driving device according to another embodiment.

As illustrated in FIG. 14, the vehicle driving device 130 includes the engine 13, the motor generator 14, and the transmission mechanism 15. The engine 13 and wheels 131 are coupled to each other via a power transmission path 132. The transmission mechanism 15 is on the power transmission path 132. The power transmission path 132 includes a path 132a coupling the engine 13 and the transmission mechanism 15, and the motor generator 14 is on the path 132a. The power transmission path 132 includes a path 132b coupling the engine 13 and the motor generator 14, and the first gear train 31 is on the path 132b. The power transmission path 132 includes a path 132c coupling the motor generator 14 and the transmission mechanism 15, and the second gear train 32 is on the path 132c. Moreover, the power transmission path 132 includes a path 132d coupling the first gear train 31 and the motor generator 14, and the engine clutch 26 is on the path 132d. The power transmission path 132 includes a path 132e coupling the engine 13 and the first gear train 31, and a damper mechanism 133 is on the path 132e. The damper mechanism 133 includes a first disc 134 coupled to the crankshaft 23, a second disc 135 coupled to the first large-diameter gear 31b, and a spring 136 attached between the discs 134 and 135.

The vehicle driving device 130, which incorporates the damper mechanism 133 in place of the torque converter 24, can function similarly to the vehicle driving device 10 described above. That is, the power performance of the hybrid vehicle 11 can be enhanced without increasing the size of the motor generator 14. Additionally, the engine starting performance can be enhanced without increasing the size of the motor generator 14. Moreover, the central axis C1 of rotation of the motor generator 14 and the central axis C2 of rotation of the engine 13 can be displaced from each other, and the flexibility in designing the vehicle driving device 130 can be increased. In the vehicle driving device 130, which incorporates the damper mechanism 133 in place of the torque converter 24, the engine 13 can be started without the use of the starter motor 85. That is, even when the vehicle is stationary, the engine 13 can be started and rotated by the use of the motor generator 14 by controlling the engine clutch 26 to operate in the engaged state and controlling the motor generator 14 to operate in the power running state. When the engine 13 is started by the use of the motor generator 14 while the vehicle is stationary, the forward clutch 45 and the backward brake 46 in the forward backward switching mechanism 21 described above are disengaged.

Figure 15:
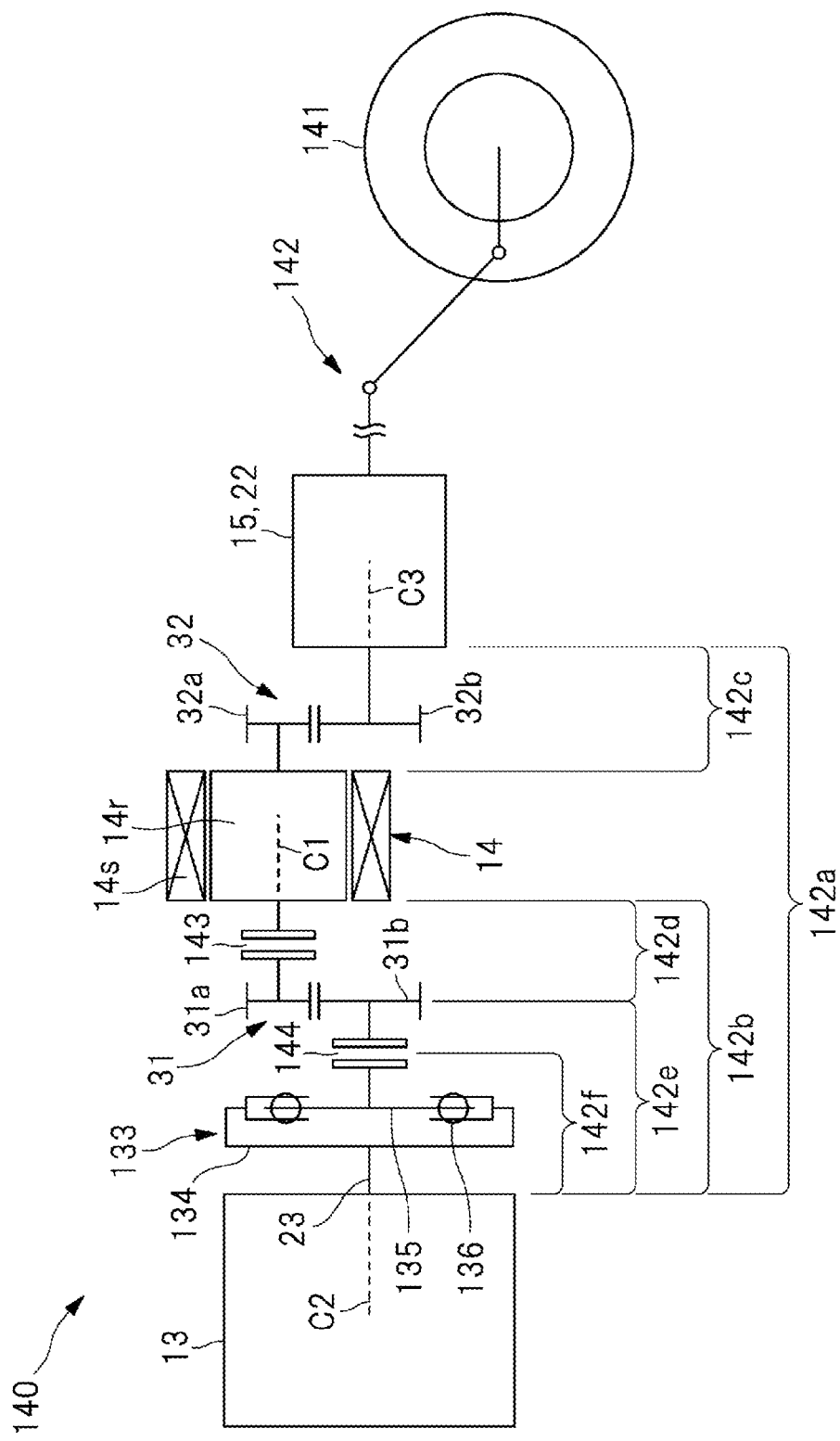
FIG. 15 illustrates a vehicle driving device according to another embodiment.

As illustrated in FIG. 15, the vehicle driving device 140 includes the engine 13, the motor generator 14, and the transmission mechanism 15. The engine 13 and wheels 141 are coupled to each other via a power transmission path 142. The transmission mechanism 15 is on the power transmission path 142. The power transmission path 142 includes a path 142a coupling the engine 13 and the transmission mechanism 15, and the motor generator 14 is on the path 142a. The power transmission path 142 includes a path 142b coupling the engine 13 and the motor generator 14, and the first gear train 31 is on the path 142b. The power transmission path 142 includes a path 142c coupling the motor generator 14 and the transmission mechanism 15, and the second gear train 32 is on the path 142c. Moreover, the power transmission path 142 includes a path 142d coupling the first gear train 31 and the motor generator 14, and a first engine clutch (clutch mechanism) 143 is on the path 142d. In one embodiment, the first engine clutch 143 may serve as the "clutch mechanism". The power transmission path 142 includes a path 142e coupling the engine 13 and the first gear train 31, and a second engine clutch 144 is on the path 142e. The power transmission path 142 includes a path 142f coupling the engine 13 and the second engine clutch 144, and the damper mechanism 133 is on the path 142f.

The vehicle driving device 140, which includes the plurality of engine clutches 143 and 144, can function similarly to the vehicle driving device 10 described above. That is, the power performance of the hybrid vehicle 11 can be enhanced without increasing the size of the motor generator 14. Additionally, the engine starting performance can be enhanced without increasing the size of the motor generator 14. Moreover, the central axis C1 of rotation of the motor generator 14 and the central axis C2 of rotation of the engine 13 can be displaced from each other, and the flexibility in designing the vehicle driving device 140 can be increased. Moreover, because the plurality of engine clutches 143 and 144 are disposed, the load acting on each of the engine clutches 143 and 144 can be reduced, and the durability of the vehicle driving device 140 can be increased.

In the example illustrated in FIG. 1, the vehicle driving device 10 is longitudinally mounted on the hybrid vehicle 11. It is not limited to that example. The vehicle driving device may be transversely mounted on the hybrid vehicle 11.

Figure 16:
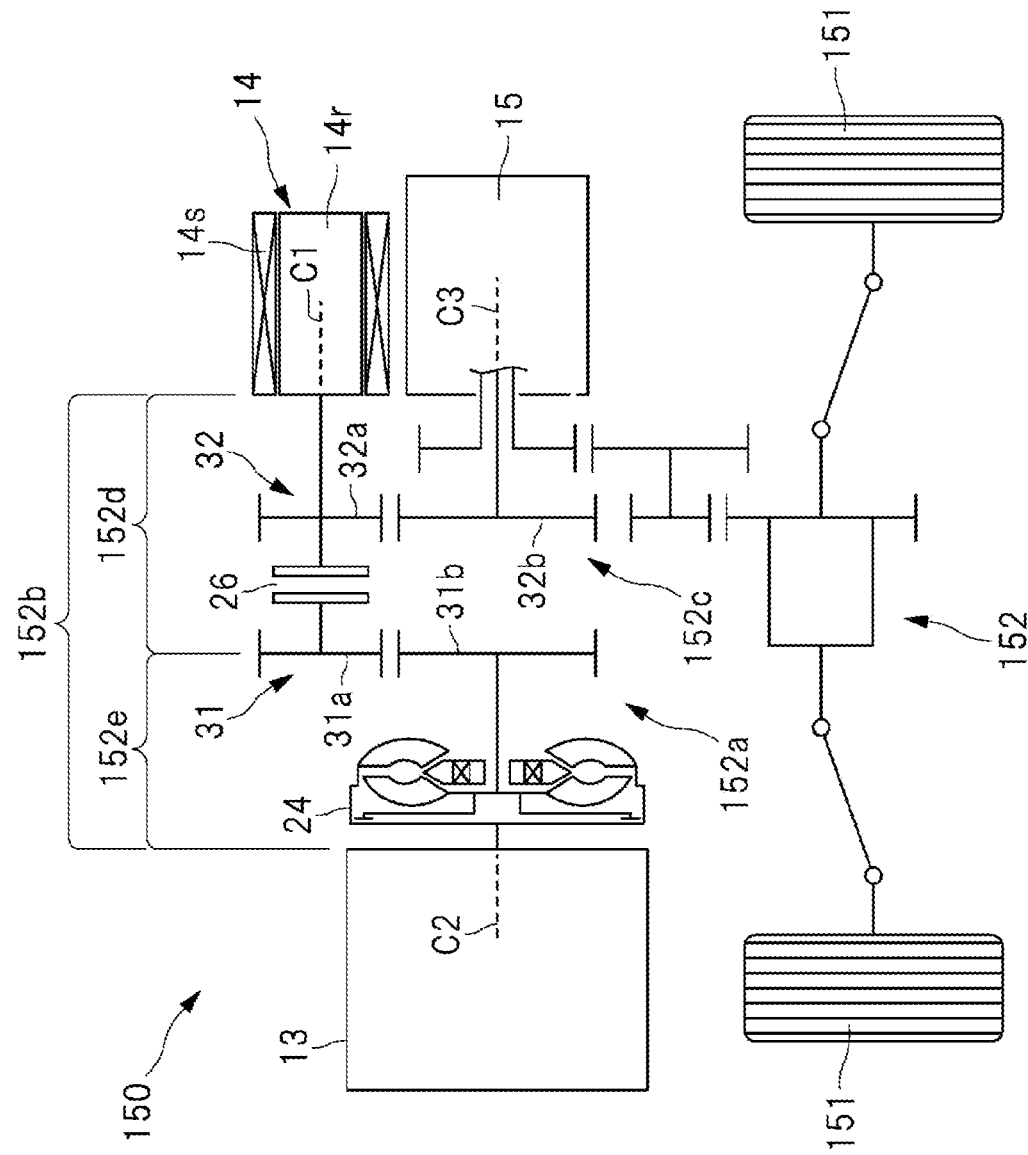
FIG. 16 illustrates a vehicle driving device according to another embodiment.

As illustrated in FIG. 16, the vehicle driving device 150 includes the engine 13, the motor generator 14, and the transmission mechanism 15. The engine 13 and wheels 151 are coupled to each other via a power transmission path 152. The transmission mechanism 15 is on the power transmission path 152. The power transmission path 152 includes a path 152a coupling the engine 13 and the transmission mechanism 15, and the motor generator 14 is on the path 152a. The power transmission path 152 includes a path 152b coupling the engine 13 and the motor generator 14, and the first gear train 31 is on the path 152b. The power transmission path 152 includes a path 152c coupling the motor generator 14 and the transmission mechanism 15, and the second gear train 32 is on the path 152c. Moreover, the power transmission path 152 includes a path 152d coupling the first gear train 31 and the motor generator 14, and the engine clutch 26 is on the path 152d. The power transmission path 152 includes a path 152e coupling the engine 13 and the first gear train 31, and the torque converter 24 is on the path 152e.

The vehicle driving device 150, which is transversely mounted on the hybrid vehicle 11, can function similarly to the vehicle driving device 10 described above. That is, the power performance of the hybrid vehicle 11 can be enhanced without increasing the size of the motor generator 14. Additionally, the engine starting performance can be enhanced without increasing the size of the motor generator 14. Moreover, the central axis C1 of rotation of the motor generator 14 and the central axis C2 of rotation of the engine 13 can be displaced from each other, and the flexibility in designing the vehicle driving device 150 can be increased.

The disclosure is not limited to the above-described embodiments, and various changes can be made without departing from the spirit thereof. In the example illustrated in FIG. 2, the engine clutch 26 is on the path 70d, which couples the first gear train 31 and the motor generator 14, in the power transmission path 70, but it is not limited to that example. The engine clutch 26 may be on a path that couples the engine 13 and the first gear train 31 in the power transmission path 70. That is, the engine clutch 26 may be in any location of the path 70a, which couples the engine 13 and the motor generator 14, in the power transmission path 70. In the vehicle driving devices 120, 130, and 150 illustrated in FIGS. 13, 14, and 16, respectively, the engine clutch 26 may be disposed on the engine side with respect to the first chain mechanism 123 or the first gear train 31. The engine clutch 26 may be a friction clutch or may also be a dog clutch. In the example illustrated in FIG. 2, the forward backward switching mechanism 21 is disposed on the output side of the transmission mechanism 15, that is, the wheels side, but it is not limited to that example. The forward backward switching mechanism 21 may be disposed on the input side of the transmission mechanism 15, that is, the engine side. For example, the forward backward switching mechanism 21 can be disposed between the torque converter 24 and the first gear train 31.

In the foregoing description, the gear ratio of the first gear train 31 is set at 0.5, and the gear ratio of the second gear train 32 is set at 2.0. They are not limited thereto. The gear ratio of the first gear train 31 may be set at any value below 1.0, and the gear ratio of the second gear train 32 may be set at any value above 1.0. In the foregoing description, the gear ratio of the first gear train 31 is set at 0.5, and the gear ratio of the second gear train 32 is set at 2.0 such that the product of both of the gear ratios is 1.0. They are not limited thereto. The gear ratio of the first gear train 31 and the gear ratio of the second gear train 32 may be set at any values where the product of both of the gear ratios is above 1.0 or at any values where that the product of both of the gear ratios is below 1.0. In the foregoing description, the plurality of control units CU1 to CU5 constitute the control system 80. It is not limited thereto. For example, a single control unit may constitute the control system 80.

The invention claimed is:

1. A vehicle driving device to be mounted on a hybrid vehicle, the vehicle driving device comprising:
    an engine configured to be coupled to wheels of the vehicle via a power transmission path;
    a transmission mechanism disposed on the power transmission path;

a motor generator disposed on a path coupling the engine and the transmission mechanism in the power transmission path;

a first power transmission mechanism disposed on a path coupling the engine and the motor generator in the power transmission path, the first power transmission mechanism comprising a first large-diameter rotator that is coupled to the engine and a first small-diameter rotator that is coupled to the motor generator, the first large-diameter rotator being larger in diameter than the first small-diameter rotator; and a second power transmission mechanism on a path coupling the motor generator and the transmission mechanism in the power transmission path, the second power transmission mechanism comprising a second small-diameter rotator that is coupled to the motor generator and a second large-diameter rotator that is coupled to the transmission mechanism, the second large-diameter rotator being larger in diameter than the second small-diameter rotator.

2. The vehicle driving device according to claim 1, further comprising:

a clutch mechanism disposed on the path coupling the engine and the motor generator in the power transmission path.

3. The vehicle driving device according to claim 2, wherein a central axis of rotation of the motor generator is positioned above a central axis of rotation of the engine.

4. The vehicle driving device according to claim 3, wherein the central axis of rotation of the motor generator and the central axis of rotation of the engine are displaced from each other in a vehicle width direction of the vehicle.

5. The vehicle driving device according to claim 4, further comprising:

a differential mechanism to be disposed on a path to couple the transmission mechanism and the wheels in the power transmission path, wherein the differential mechanism is positioned below the motor generator.

6. The vehicle driving device according to claim 3, further comprising:

a differential mechanism to be disposed on a path to couple the transmission mechanism and the wheels in the power transmission path, wherein the differential mechanism is positioned below the motor generator.

7. The vehicle driving device according to claim 2, wherein a central axis of rotation of the motor generator and a central axis of rotation of the engine are displaced from each other in a vehicle width direction of the vehicle.

8. The vehicle driving device according to claim 7, further comprising:

a differential mechanism to be disposed on a path to couple the transmission mechanism and the wheels in the power transmission path, wherein the differential mechanism is positioned below the motor generator.

9. The vehicle driving device according to claim 2, further comprising:

a differential mechanism to be disposed on a path to couple the transmission mechanism and the wheels in the power transmission path, wherein the differential mechanism is positioned below the motor generator.

10. The vehicle driving device according to claim 1, wherein a central axis of rotation of the motor generator is positioned above a central axis of rotation of the engine.

11. The vehicle driving device according to claim 10, wherein the central axis of rotation of the motor generator and the central axis of rotation of the engine are displaced from each other in a vehicle width direction of the vehicle.

12. The vehicle driving device according to claim 11, further comprising:

a differential mechanism to be disposed on a path to couple the transmission mechanism and the wheels in the power transmission path, wherein the differential mechanism is positioned below the motor generator.

13. The vehicle driving device according to claim 10, further comprising:

a differential mechanism to be disposed on a path to couple the transmission mechanism and the wheels in the power transmission path, wherein the differential mechanism is positioned below the motor generator.

14. The vehicle driving device according to claim 1, wherein a central axis of rotation of the motor generator and a central axis of rotation of the engine are displaced from each other in a vehicle width direction of the vehicle.

15. The vehicle driving device according to claim 14, further comprising:

a differential mechanism to be disposed on a path to couple the transmission mechanism and the wheels in the power transmission path, wherein the differential mechanism is positioned below the motor generator.

16. The vehicle driving device according to claim 1, further comprising:

a differential mechanism to be disposed on a path to couple the transmission mechanism and the wheels in the power transmission path, wherein the differential mechanism is positioned below the motor generator.

* * * * *